Figure 1:
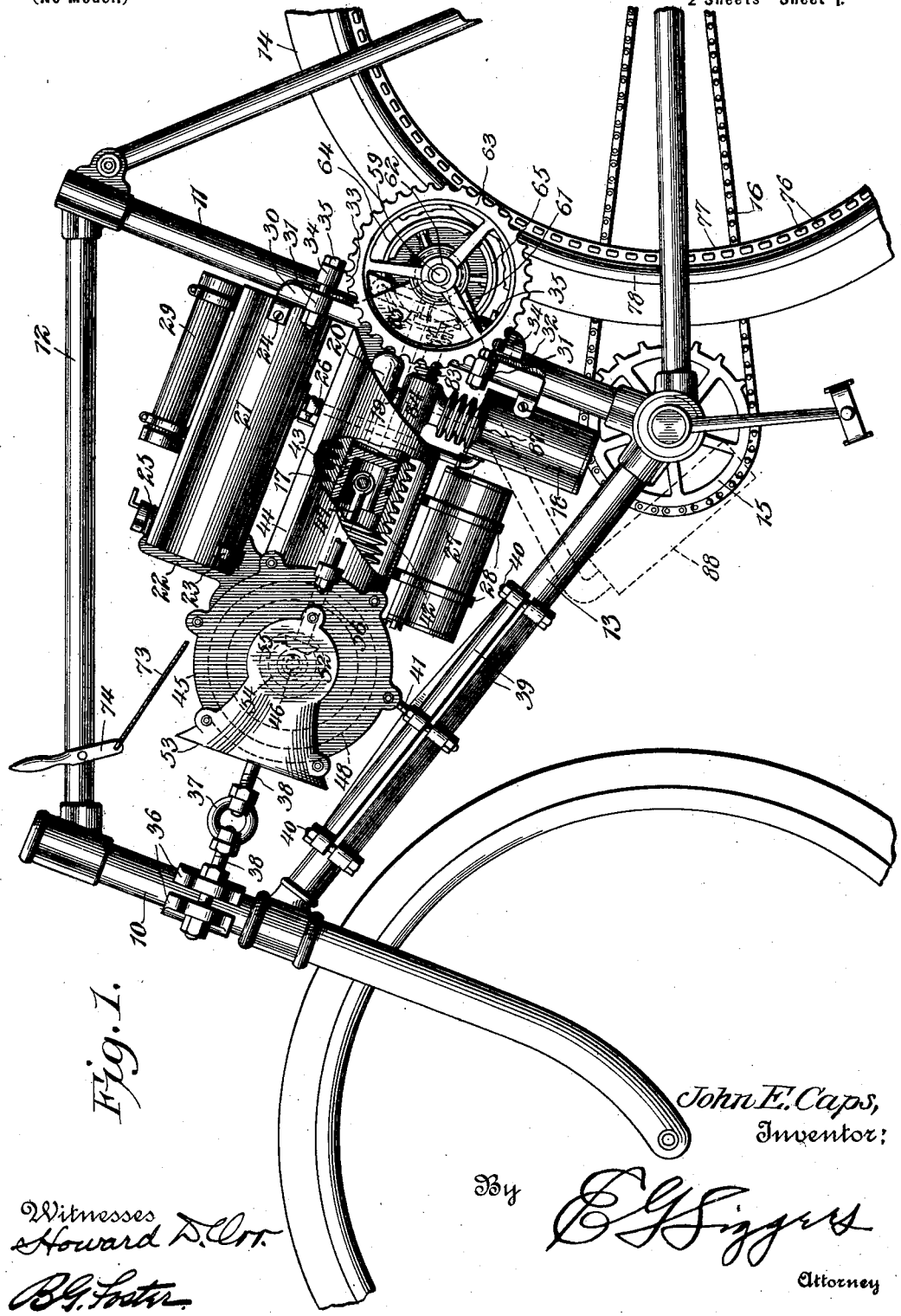

No. 699,284. Patented May 6, 1902.
J. E. CAPS.
MOTOR VEHICLE.
(Application filed June 14, 1901.)
(No Model.) 2 Sheets—Sheet 1.

Witnesses
Howard D. Orr.
B. G. Foster.

John E. Caps,
Inventor:
By
Attorney

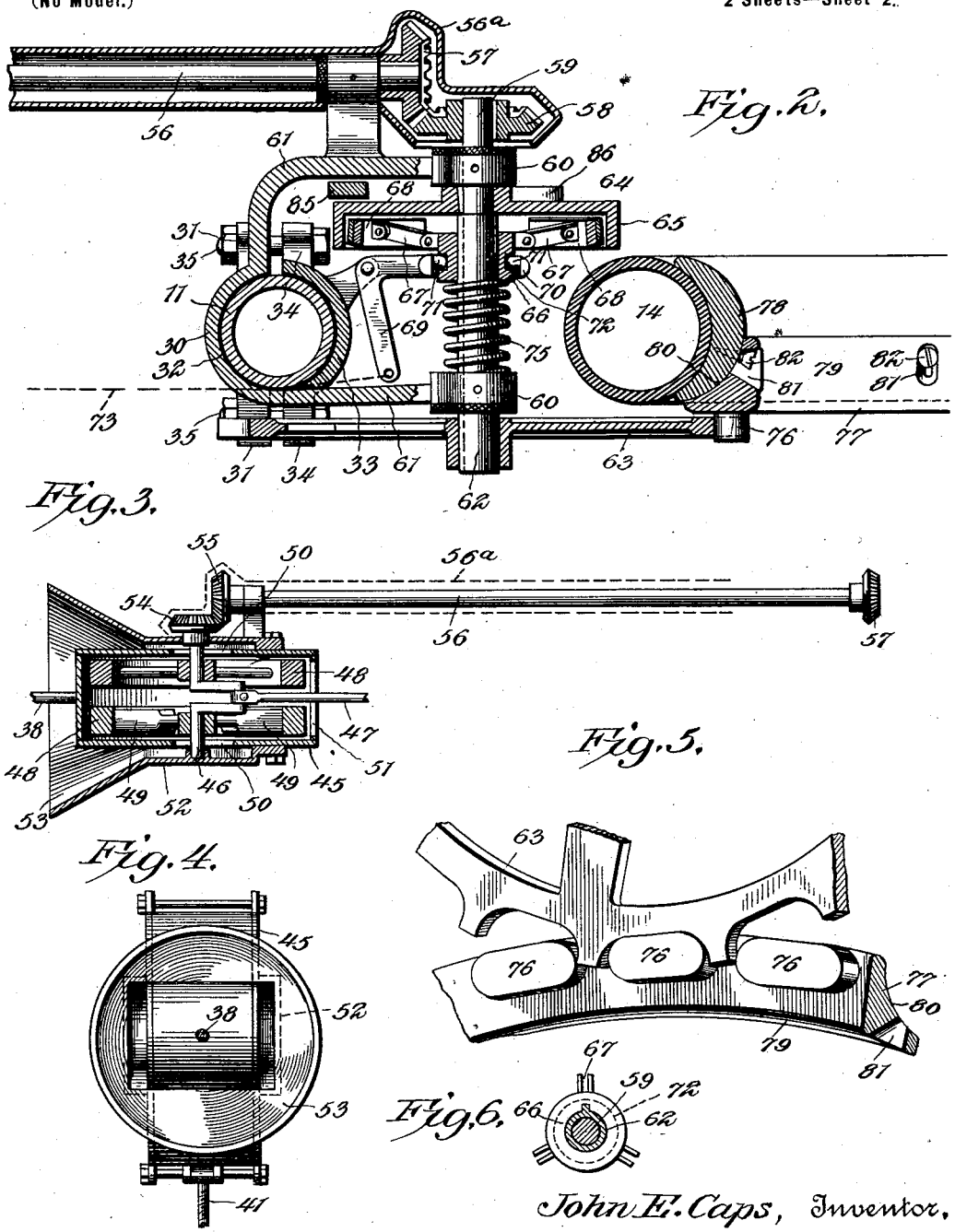

UNITED STATES PATENT OFFICE.

JOHN EDWARD CAPS, OF KANSAS CITY, MISSOURI.

MOTOR-VEHICLE.

SPECIFICATION forming part of Letters Patent No. 699,284, dated May 6, 1902.

Application filed June 14, 1901. Serial No. 64,583. (No model.)

*To all whom it may concern:*

Be it known that I, JOHN EDWARD CAPS, a citizen of the United States, residing at Kansas City, in the county of Jackson and State of Missouri, have invented a new and useful Motor-Vehicle, of which the following is a specification.

The present invention relates to motor-vehicles, and while it is particularly intended for bicycles it will be clearly understood by those skilled in this art that the invention can be readily employed in connection with other classes of vehicles.

One of the prime objects of the invention is to provide mechanism that can be readily applied by an unskilled person to an ordinary bicycle or other vehicle without the necessity of reorganizing or in any manner changing the construction of such vehicle.

Another object is to assemble the several elements which comprise the driving mechanism and secure them together so that they form as a whole a complete attachment which may be fastened to a vehicle in a manner readily understood.

Another important object is to provide novel driving mechanism designed more especially for use upon a bicycle or manually-propelled vehicle, which may be thrown out of operative relation with respect to the vehicle, so that in starting it the rider may operate said vehicle in the usual manner and afterward can bring the driving mechanism into operative relation.

Other features reside in improved mechanism for cooling the engine and in improving the valve-operating mechanism therefor, so that a compact structure is provided.

In order that those skilled in the art may readily understand the construction, application, and operation of this invention, the embodiment thereof which is at present considered preferable is described in the following specification and illustrated in the accompanying drawings. Such changes therefrom may be made, however, as fall within the scope of the claims hereto appended.

In the drawings, Figure 1 is a side elevation of a portion of a bicycle, showing the improved driving mechanism applied thereto. Fig. 2 is a horizontal sectional view, on an enlarged scale, through the driving-shaft, more clearly illustrating the clutch mechanism and the manner of supporting the same upon the bicycle-frame. Fig. 3 is a horizontal sectional view through the fan-casing, more clearly illustrating the construction and operation of the fan and the connection between the engine and the engine-shaft. Fig. 4 is a front elevation of the fan-casing. Fig. 5 is a detail view, on an enlarged scale, of a portion of the spur-wheel and the toothed track; and Fig. 6 is a detail sectional view of the driving-shaft.

Similar numerals of reference designate corresponding parts in all the figures of the drawings.

The embodiment shown in the accompanying drawings is designed as an attachment to an ordinary and well-known form of bicycle, and for the purpose of more clearly illustrating the application of the same the greater portion of such a vehicle is illustrated. The steering-head bar is designated by the reference-numeral 10 and the upright seat-post tube by 11. These respective elements are connected by the back bar 12 and the lower bar 13. A portion of the rear or driving wheel of the bicycle is shown and designated 14, and the usual sprocket-wheel 15 and chain 16, secured thereto and connected to the rear wheel, is also shown.

In the present construction an explosive-motor is employed, the engine being indicated at 17. Beneath the engine and secured thereto is a carbureter 18, which may be of any desired construction and is provided with a conducting-pipe 19, that leads to the inlet valve casing 20 of the engine. Upon the engine is detachably supported a hydrocarbon-reservoir 21. For this purpose the front end of the engine-frame has an upstanding bracket 22, the lower portion of which carries outstanding side arms 23. One end of the reservoir is fitted into this bracket, while the other end is detachably secured by a screw 24 to the fastening-bracket hereinafter described. The reservoir 21 is provided with a suitably-plugged filling-opening 25, and a valved conducting-pipe 26 leads from said reservoir to a carbureter. A battery 27 is suspended by loops 28 to the under side of the engine, and the spark-coil 29 is in like manner fastened to the upper portion of the reservoir. These several elements may in themselves be of any desired and well-known construction; but they are thus secured together so as to form a complete attachment that will fit within the frame of an ordinary bicycle and can be attached to or removed therefrom as a whole.

The means for securing the attachment in place is as follows: A semicircular clamp-plate 30 is secured at its opposite ends, respectively, to the reservoir 21 and the carbureter 18, and is provided with offset perforate ears 31. This clamp-plate is arranged to fit against the inner side of the seat-post tube 11, suitable material 32 being interposed between the same to prevent marring or scratching of the enamel. A similarly-shaped clamp-plate 33 is located upon the opposite side of the tube and is provided with perforate ears 34, which are arranged to aline with ears 31 of the other plate. The two plates are secured together by means of fastening-bolts 35, that pass through these alined ears, and thus clamp the rear end of the attachment to the frame. The opposite end of the attachment is adjustably secured to the steering-head tube 10, and for this purpose a two-part clamp 36 is provided, which embraces said tube, said clamp being connected to the adjacent end of the attachment by means of a turnbuckle 37, that engages oppositely-screw-threaded projecting studs 38, secured respectively to the clamp and the motor. The motor is also attached to the lower bar 13 by means of semicircular clamp-plates 39, which are located on opposite sides of said bar and are secured together by fastening-bolts 40. These clamping-plates are connected by a threaded bolt 41 to the lower side of the forward lower portion. In actual construction it has been found necessary to make the clamp-plates of considerable length in order to prevent the buckling of the lower bar due to the strain placed thereon. The device is thus held rigidly within the frame and can be readily applied to any bicycle because of the latitude of adjustment allowed by the turnbuckle connection between its forward end and the clamp that engages the steering-head.

The engine 17, as shown, consists of a cylinder 42, within which is slidably mounted the reciprocating piston 43. The cylinder is surrounded by a jacket 44, that is spaced from the walls thereof and is open at both ends. To the forward end of this jacket is secured a casing 45, within which is rotatably mounted a crank-shaft 46, that is connected to the piston 43 by means of the pitman 47. A pair of balance-wheels 48 are secured to the shaft 46 on opposite sides of the pitman connection, and the spokes of one of these wheels are constructed in the form of fan-blades 49. The casing 45 is provided with side openings 50, which provide for the inflow of air, and the rear end of said casing has an exhaust-opening 51, that communicates with the jacket 44 of the engine-cylinder. An air-conducting casing 52 surrounds the fan-casing 45 and has its front end open and flared to form an inlet-funnel 53. It will thus be seen that a current of air will be generated by the rotation of the fan and will be driven through the exhaust-opening 51 into the jacket 44, that surrounds the cylinder. By this means, therefore, the cylinder will be kept at a comparatively low temperature.

One end of the engine-shaft 46 projects beyond the fan-casing and is provided with a bevel-gear 54, that meshes with a similar gear 55, secured to the end of a shaft 56, arranged longitudinally of the motor and provided at its opposite end with a bevel-gear 57, that meshes with a similar gear 58, keyed or otherwise secured to a transverse driving-shaft 59, located at the rear end of the motor. A casing 56$^a$ surrounds the shaft 56 and the several intermeshing gear-wheels to protect the same from dust and dirt. The shaft 59 is mounted is bearings 60, secured in the opposite ends of a yoke 61, that forms part of the clamp-plate 30 and projects beyond the rear edge of the upright seat-post tube 11. Mounted upon this shaft is a sleeve 62, that is freely rotatable thereon, and this sleeve carries on its projecting end a spur driving-wheel 63. A clutch connection is provided between the sleeve and the shaft 59, and said clutch is preferably constructed as follows: A friction-disk 64 is keyed to the shaft 59 at the inner end of the sleeve 62 and is provided with a peripheral offset flange 65. A collar 66 is keyed to the sleeve 62, but is slidable thereon and carries pivoted radially-disposed links 67, to the outer ends of which are secured friction-clutch shoes 68. A bell-crank lever 69 is pivoted to the clamp-plate 33 and is provided with a yoke 70, that surrounds the collar 66 and has studs 71, that engage in an annular groove 72 in said collar. An operating-cord 73 is secured to the opposite end of the bell-crank lever and is connected to a handle-lever 74, that is pivotally attached intermediate its ends to the forward portion of the back bar 12 of the frame.

A coiled spring 75 surrounds the sleeve 62 and normally bears against the collar 66 to force said collar toward the friction-disk 64, and consequently move the shoes into engagement with the peripheral flange thereof. It will thus be seen that when there is no tension upon the operating-cord the shoes 68 will be forced into engagement with the flange 65, and the sleeve and shaft will therefore be clutched together and move in unison. When, however, the operating-lever 64 is moved, the bell-crank 69 will be correspondingly moved to draw the collar against the tension of the coiled spring 73 and the shoes 68 will be moved out of engagement with the friction-disk. The shaft 59 will therefore rotate entirely independent of the sleeve 62.

The spur-wheel 63 is arranged to mesh with the teeth 76 of a track 77, that is arranged to be secured to the rim 78 of the rear wheel of the bicycle. This track comprises an annular ring 79, having a curved face 80, that is arranged to fit against the corresponding face of the rim 78. It is provided upon its outer face with a series of the offset spaced teeth 76, with which the teeth of the spur-wheel 63 intermesh. The ring is furthermore provided with a plurality of transverse slots 81, through which fastening devices, such as screws 82, are adapted to be passed and engage in the rim 78. The track can therefore be adjusted to the driving-wheel and can be fitted to various kinds of rims.

In order to operate the exhaust-valve of the engine, novel mechanism is employed, which is substantially as follows: The valve-stem 83 projects beyond the valve-casing 84 and has its outer end located adjacent to the friction-disk 64 of the driving-shaft. A dog 85 is pivoted to the fastening-bracket above the stem and has its lower end arranged directly in rear of the same. A cam projection 86 is located upon the exterior face of the friction-disk 64 and the dog 85 is located in the path of movement thereof, so that when said disk is rotated the cam projection 86 will engage said dog and move it forward, consequently moving the exhaust-valve and permitting the escape of the spent gases. The exhaust flows from the exhaust-valve casing 84 into a nipple 87, to which may be attached a muffler, as indicated at 88 in Fig. 1, said muffler discharging below the frame.

In applying the device to a bicycle the clamp-plates 30 and 32 are first applied, after which the forward clamp is applied to the front end of the frame. The turnbuckle is then tightened until the motor is rigidly secured, whereupon the lower clamp is secured to the lower bar. The driving-wheel 63 will thereupon be located adjacent to the rear wheel of the bicycle and the track is then secured in proper position, so that the teeth thereof will intermesh with the teeth of the driving-wheel.

In operating the device the sleeve and driving-shaft are unclutched and the motor is started before the rider mounts. Said motor is therefore operating without driving the bicycle. At the same time a current of air is being drawn through the funnel by means of the balance fly-wheel and is driven over the engine-cylinder, keeping the same cool. The rider then mounts and starts off with the pedals in the usual manner, and after getting well started the clutch is moved to its operative position, thus connecting the motor and the driving-wheel.

The construction as thus set forth embodies several advantages. In the first place, the attachment may be readily applied by an unskilled person to bicycles of various sizes. Furthermore, a high-speed motor of small power may be employed for the reason that the connection with the wheel is made near the periphery thereof. At the same time there is very little strain upon said motor in starting, as the power may be applied gradually and while the machine is in motion. The arrangement of an air-cooling device is especially applicable to constructions of this kind for the reason that it is impracticable to carry water or other cooling agents, and the novel valve-operating mechanism provides a construction that is compact and protected from being accidentally struck and operated at an improper time.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In a driving attachment for a vehicle, the combination with a motor, of a spur-wheel operated by the motor, a toothed track arranged to be engaged by the spur-wheel and adapted to fit upon the inner side of the rim of a wheel, and means for securing the track to said rim.

2. In a motor-vehicle, the combination with a driven wheel, of a pedal-shaft having pedals secured thereto, connections between the pedal-shaft and the hub of the driven wheel, a motor secured upon the vehicle, gear connections between the motor and the rim of the wheel, and a clutch included in said connections for disconnecting the motor from the driven wheel.

3. In a motor-vehicle, the combination with a driven wheel, of an explosive-engine supported upon the vehicle, connections between the engine and the wheel, said connections including a shaft carrying a clutch which comprises separate members, a valve for the explosive-engine, and operating mechanism for the valve, said mechanism including a lever and a projection attached to one of the clutch members and adapted to engage the lever upon the rotation of the shaft.

4. In a driving attachment for vehicles, the combination with a motor, of a clamp having a rigid connection with one end of the motor and arranged to be secured to the frame-bar of a vehicle contiguous to one of the wheels thereof, and extensible means located at the opposite end of the motor for securing the same to another frame-bar.

5. In a driving attachment for a vehicle, the combination with a motor, of an upright clamp having a rigid connection at one end of the motor and arranged to be secured to the upright frame-bar of a bicycle contiguous to the driving-wheel thereof, a clamp arranged to be secured to the head-bar of a bicycle, and an extensible connection between the last-named clamp and the motor.

6. In a driving attachment for a vehicle, the combination with a motor, of a spur-wheel operated by the motor, a toothed track arranged to be engaged by the spur-wheel, and means for adjustably securing the track to the rim of a vehicle-wheel.

7. In a driving attachment for a vehicle, the combination with a motor, of a spur-wheel operated by the motor, a toothed track arranged to be engaged by the spur-wheel and provided with slots and devices for securing said track to the rim of the vehicle, said devices passing through the slots, whereby the track will be adjustably secured to the wheel.

8. In a driving attachment for a vehicle, the combination with a motor, of a spur-wheel operated by the motor, a track arranged to be engaged by the spur-wheel, said track comprising a ring having a plurality of spaced and laterally-offset teeth that intermesh with the spurs of the wheel, and means for securing the track to a vehicle-wheel.

9. In a driving attachment for a vehicle, the combination with a motor, of a spur-wheel, a clutch connection between the motor and the spur-wheel, means for operating the clutch, a track arranged to be engaged by the spur-wheel, and means for securing said track to a vehicle-wheel.

10. In a motor-vehicle, the combination with the vehicle, of a continuous track secured to a wheel of the vehicle, a motor carried by the vehicle, a spur-wheel having an operative engagement with the track, clutch connections between the motor and the gear-wheel, and means for operating the clutch.

11. In mechanism of the class described, the combination with a motor, of a shaft operatively connected with the motor, a spur-wheel mounted upon the shaft, a clutch connection between the shaft and spur-wheel, means for operating the clutch, a track arranged to be engaged by the spur-wheel, and means for securing said track to a vehicle-wheel.

12. In mechanism of the class described, the combination with a motor, of a shaft operatively connected with the motor, a sleeve rotatably mounted on the shaft, a clutch connection between the sleeve and shaft, means for operating the clutch, a spur-wheel secured to the sleeve, a track arranged to be engaged by the spur-wheel, and means for securing the said track to a vehicle-wheel.

13. In mechanism of the class described, the combination with a motor, of a shaft operatively connected with the motor, a sleeve rotatably mounted on the shaft, a flanged friction-disk secured to the shaft at one end of the sleeve, a collar slidably mounted upon the sleeve and carrying shoes arranged to engage the flange of the disk, means for sliding the collar, a spur-wheel secured to the sleeve, a track arranged to be engaged by the spur-wheel, and means for securing said track to a vehicle-wheel.

14. In mechanism of the class described, the combination with a motor, of journals secured to the opposite ends of the engine, a motor-shaft mounted in the journals at one end of the motor, a driving-shaft mounted in the journals at the opposite end of the motor, means operatively connecting the motor and driving-shafts, and driving mechanism connecting said driving-shaft and a vehicle-wheel.

15. In mechanism of the class described, the combination with a motor, of journals secured to opposite sides of the motor, a motor-shaft mounted in the journals at one end of the motor, a driving-shaft mounted in the journals at the opposite end of the motor, means operatively connecting the motor and driving-shafts, and driving mechanism connecting said driving-shaft and a vehicle-wheel, said mechanism including a clutch and means for operating said clutch.

16. In an attachment of the class described, the combination with an explosive-engine, of a carbureter suspended beneath the same, a fuel-receptacle supported upon and located above the engine, driving mechanism carried by and connected with the engine, and means for securing the attachment to a vehicle.

17. In an attachment of the class described, the combination with an explosive-engine, of a carbureter secured to and suspended beneath said engine, a fuel-receptacle supported upon the engine, driving mechanism carried by and connected with the engine, a blower secured at one end of the engine and connected to the driving mechanism, means for directing the current of air from the blower over the engine, and clamps secured to the attachment for fastening the same to a vehicle.

18. In mechanism of the class described, the combination with an engine and valves therefor, of an engine-shaft located transversely across one end of the engine and having an operative connection therewith, a driving-shaft located transversely across the opposite end of the engine, connections between the engine-shaft and driving-shaft, valve-operating mechanism carried by said driving-shaft, and means for connecting the driving-shaft to a vehicle.

19. In a driving attachment for vehicles, the combination with a motor, of a clamp secured to one end of the motor, an adjustable clamp located at the other end of the motor, and a turnbuckle connection between the latter clamp and the motor.

20. In an attachment of the class described, the combination with a motor, of a clamp for securing the motor to a vehicle, a driving-shaft mounted upon the clamp, connections between the motor and the driving-shaft, and means for connecting the driving-shaft to a vehicle-wheel.

21. In an attachment of the class described, the combination with a motor, of a two-part clamp, one part of which is attached to the motor, a driving-shaft mounted upon said attached part, connections between the motor and the driving-shaft, and means for connecting the driving-shaft to a vehicle-wheel.

In testimony that I claim the foregoing as my own I have hereto affixed my signature in the presence of two witnesses.

JOHN EDWARD CAPS.

Witnesses:
LINWOOD M. HARRIMAN,
J. HOWARD WELCH.